Patented Sept. 9, 1952

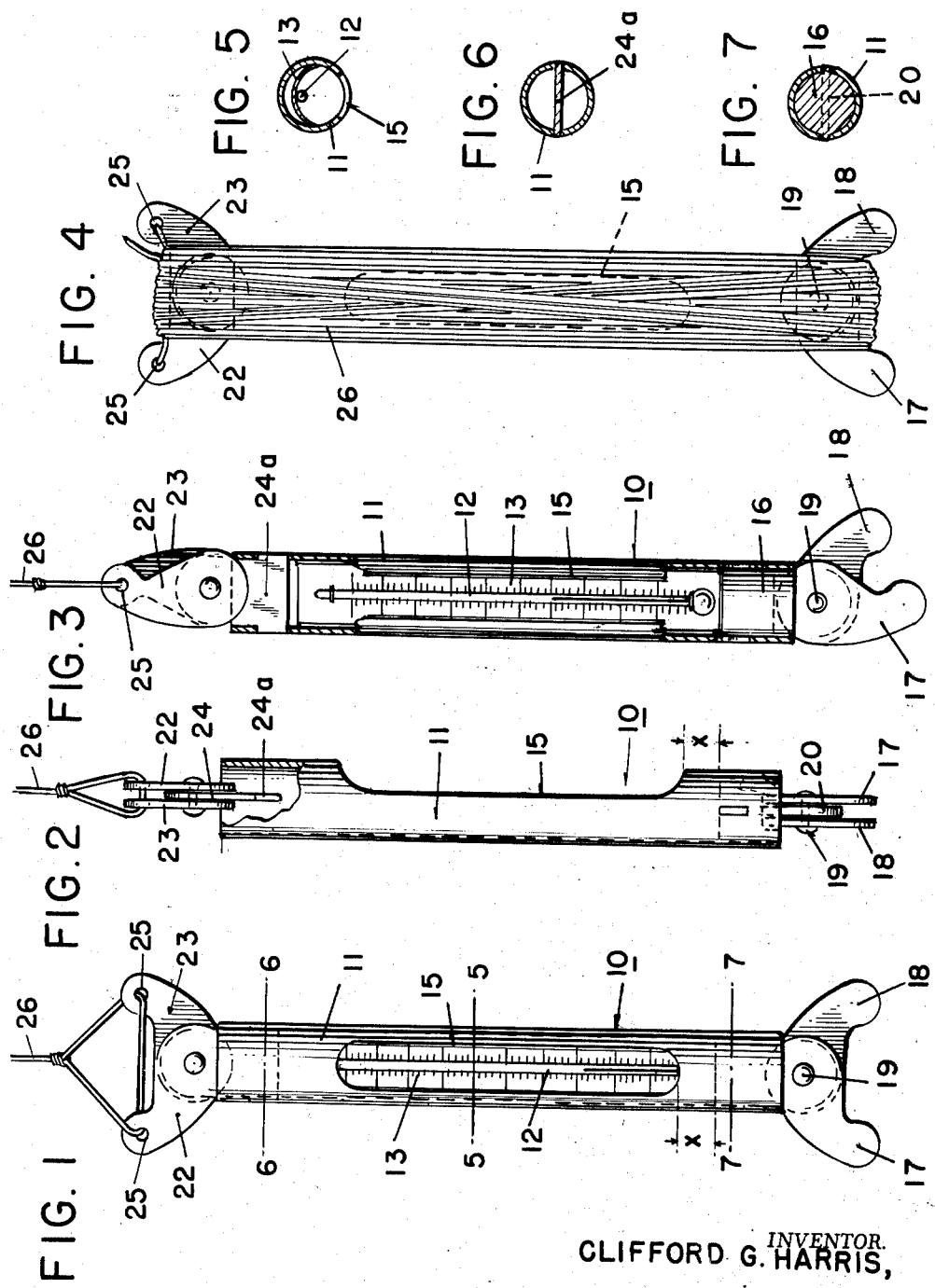

2,609,689

UNITED STATES PATENT OFFICE 2,609,689

UNDERWATER SAMPLING THERMOMETER

Clifford G. Harris, Binghamton, N. Y.

Application January 25, 1949, Serial No. 72,571

9 Claims. (Cl. 73—343)

This invention relates to improvements in thermometers, and more particularly to an improved sampling type of thermometer capable of a variety of uses but especially designed for underwater use by fishermen in determining the temperature of the water at various fishing depths.

A principal object of the invention is the provision of a sampling thermometer which may be inexpensively manufactured, which is characterized by simple yet rugged construction, which is thoroughly practical and dependable in use, and which is so designed that it is capable of withstanding rough usage.

Another important object of the invention is the provision of a sampling thermometer especially designed for use by fishermen in determining the temperature of the water at the various fishing depths, wherein the thermometer casing is so constructed as to provide a means on and from which the line used in lowering and raising the thermometer may be wound and unwound as required.

A further object of the invention is the provision of a novel casing for a sampling thermometer incorporating pivoted ears at the ends thereof which are capable of movement from a position in which they are contained substantially within the section of the casing to a spread position in which they provide the casing with notched ends and thereby convert the same for use as a reel or wind-up means for the line used in lowering and raising the thermometer.

A still further object of the invention is the provision of a fishing thermometer including means for protecting the thermometer proper against jars and shocks likely to be encountered upon the thermometer striking submerged or bottom rocks and similar obstructions and which further protects the thermometer against fouling in weeds, grasses and the like.

The above and other objects and advantages of the invention will be apparent from the following detailed description taken with the accompanying drawing illustrating a preferred physical embodiment thereof, in which—

Fig. 1 is a front elevational view of the improved sampling thermometer according to the invention ready for lowering, the ends ears thereof being shown in their spread position;

Fig. 2 is a side elevation thereof;

Fig. 3 is a part-sectional view similar to Fig. 1, but illustrating the upper ears in the position which they assume upon lowering of the thermometer, and further illustrating one of the lower ears in a closed position which it takes upon engaging a submerged rock and the like;

Fig. 4 is a view similar to Fg. 1 but illustrating the lowering and raising cord wound on the thermometer casing; and Figs. 5, 6 and 7 are sections taken respectively on lines 5—5, 6—6 and 7—7 of Fig. 1.

In the drawings, reference character 10 generally indicates a sampling thermometer as proposed, which is illustratively shown to comprise a thermometer casing 11, and a thermometer 12 of the elongated glass tube type having a mercury bulb which is mounted on and forwardly of a scale 13.

The thermometer casing 11 may comprise a length of tubing fabricated from a suitable non-rusting material, being provided in its cylindrical wall and intermediate its ends with an elongated window or opening 15, through which the thermometer and scale are readily viewable. The casing is closed at its bottom end by a plug 16 (Fig. 3) which is solidly fixed in place by suitable means and is preferably formed of sufficiently heavy material as to weight the bottom end of the casing. The plug 16 terminates substantially below the bottom edge of the window 15, thus to provide a space X (Figs. 1 and 2) between window edge and plug, which serves both to receive the mercury bulb and also as a well to retain water from the depth to which the thermometer is lowered. Obviously, in raising the thermometer, the temperature of the water trapped in said well will not change materially, so that an accurate reading of the water temperature at the various levels to which the thermometer is lowered may be obtained.

According to the invention, the scale 13 to which the thermometer tube is attached is of relatively stiff yet springy material such as plastic sheeting. The width and length of the scale is carefully chosen so that upon simple insertion thereof into the casing until the lower end edge thereof engages the plug 16, the thermometer and scale are properly positioned with respect to the window 15. As respects its width dimension, such is somewhat in excess of the internal diameter of the casing whereby in inserting the scale into the casing it must be flexed or concaved about its longitudinal center line, as seen in Fig. 5. Thus, when the scale is so flexed and inserted into the casing, it tends to spring back to its initial plane-form and thereby secures itself frictionally against the inner surface of the casing. This tendency also causes the scale to lift slightly away from the inner surface of the casing along its longitudinal center-line portion, so as to provide a cushioning effect for the thermometer and mercury bulb, whereby the latter are effectively cushioned against damage due to shocks and jars to which the casing is subjected.

According to a further feature of the invention, the casing is provided at both its upper and lower ends with means providing end notches on the casing, and which serve in one of their functions as a means for converting the casing to a reel or wind-up device for the line by which the thermometer is lowered and raised. This desirable result is obtained by providing each end of the casing with a pair of freely pivoted ears, of which the bottom ears 17 and 18 are pivotally connected by a pivot pin 19 to a blade or tip 20 which may be fixed in the bottom plug 16 so as to project from the bottom end of the plug. The top end ears 22, 23 are pivoted in similar manner to a blade or tip 24 projecting outwardly from the upper end of the casing and whose shank end 24a may be fixedly secured to the casing by appropriate means as shown in Fig. 3.

It will be seen from Figs. 1 and 3 that the axes of the upper and lower pivot pins are parallel to each other and are moreover disposed normal to the general plane of the window opening, whereby when the raising and lowering line is wound on the casing, as will be described, it covers the window in the manner illustrated in Fig. 4.

Referring to Fig. 1, the aforesaid ears are each preferably formed with enlarged hubs, the relatively outer edges of which are adapted to abut against the end edges of the casing upon the ears being fully spread whereby the outward spreading movement of the ears is limited to about the position thereof as illustrated in Fig. 1. The free ends of the ears are rounded as shown so that they present no constructional obstructions as would cause the ears to become fouled in seaweed, bottom grass, and the like. Referring to Figs. 1 and 4, the free ends of the upper ears 22, 23 are each provided with an aperture 25, through which the line or cord 26 by which the thermometer is lowered and raised may be threaded. As seen in Fig. 1, the line may be threaded through the upper ear apertures 25 and secured to itself above the ears so as to provide an attaching loop.

During periods of non-use, the upper and lower pairs of ears are spread to provide the thermometer casing 11 with notched ends on which the lowering and raising line may be wound as illustrated in Fig. 4, to provide a compact sampling thermometer and suspension line package wherein the thermometer tube is protected by the line wound on the casing and which covers the window 15 thereof. When it is desired to determine water temperature at any particular depth, the line is unwound from the casing and the thermometer lowered to a depth at which a temperature reading is desired. To facilitate this operation, the line may be provided with unit-of-length markings along its length whereby the depth to which the thermometer is lowered may be simply established.

As the thermometer begins to lower, the pull of the line on the upper ears 22, 23 causes the same to swing inwardly to their closed position illustrated in Fig. 3, in which the upper ears are contained within the circular section of the casing. The lower end ears 17, 18 remain in their spread position during lowering and, if they strike the bottom, provide a two-point support for the thermometer. If either bottom ear strikes a submerged rock or similar obstruction during lowering or if accidentally dragged along the bottom, it is pushed to its closed position, as illustrated by the lefthand bottom ear shown in Fig. 3, in which it tends in assisting the thermometer to ride off or over the rock without damage and without the ears becoming snagged.

Without further analysis, it will be seen that the sampling thermometer of this invention attains the desirable objectives hereinbefore set forth. Its design and construction are exceedingly simple, so that it may be inexpensively manufactured, while at the same time being rugged and thoroughly practical in use. The ears provided at the upper and lower ends of the casing are of advantage in converting the casing to a wind-up device for the line by which the thermometer is lowered and raised as required in obtaining a temperature reading. When the line is wound on the casing as illustrated in Fig. 4, it covers the window 15, thus protecting the thermometer-tube 12 against breakage when the device is thrown into or kept in a fishing tackle box with tools and other hard objects. The bottom ears, in particular, are of further advantage in protecting the thermometer against shock or damage likely to be incurred upon the thermometer striking a submerged rock or similar obstruction. Said ears are moreover so shaped that they tend to reduce the possibility of the thermometer being fouled in water grasses.

As many changes could be made in carrying out the above constructions without departing from the scope of the invention, it is intended that all matter contained in the above description or shown in the accompanying drawings shall be interpreted as illustrative and not in limiting sense.

I claim:

1. In a sampling thermometer adapted to be lowered to varying depths in a liquid, a thermometer casing provided with spreadable ears at each end thereof for holding a lowering and raising line wound about and endwise of said casing.

2. In a sampling thermometer adapted to be lowered to varying depths in a liquid, a thermometer casing provided with spreadable ears at each end thereof for holding a lowering and raising line wound about and endwise of said casing, said ears being shaped to provide notched ends on said casing.

3. In a sampling thermometer adapted to be lowered to varying depths in a liquid, a thermometer casing, a pair of ears pivoted to each end of said casing, said ears being movable laterally outwardly of said casing to provide notched ends for holding a lowering and raising line wound about and endwise of said casing.

4. In a sampling thermometer adapted to be lowered to varying depths in a liquid, a thermometer casing, a pair of ears pivoted to each end of said casing, said ears being movable laterally outwardly of said casing to provide notched ends for holding a lowering and raising line wound about and endwise of said casing; and said ears of a pair being movable towards one another to lie substantially within the section of said casing.

5. In a sampling thermometer adapted to be lowered to varying depths in a liquid, a thermometer casing provided with a pair of ears pivoted to each end of said casing, said ears being movable laterally outwardly from said casing to provide notched ends for holding a lowering and raising line wound about and endwise of said casing, the line being attached to one pair of ears in such manner that a pull thereon will move said ears inwardly towards each other.

6. In a sampling thermometer adapted to be lowered to varying depths in a liquid, a thermometer casing provided with a pair of ears pivoted to each end of said casing, said ears being movable laterally outwardly from said casing to provide notched ends thereon for holding a lowering and raising line wound about and endwise of said casing, the line being attached to one pair of ears in such manner that a pull thereon will move said ears inwardly towards each other, the ears of the other pair being normally spread in use but being movable towards one another upon engaging an obstruction.

7. In a sampling thermometer adapted to be lowered to varying depths in a liquid, a tubular thermometer casing, a plug closing the lower end of the casing, a blade projecting axially from each of the casing ends, a pair of ears for each blade pivotally connected at their one ends to their respective blade for movement from a retracted to a spread position in which they form notches at the ends of the casing, the upper ears being apertured at their free ends for attachment thereto of a thermometer lowering and raising line, the upper and lower ears when spread providing for winding of the line through the notches formed thereby at the ends of the casing and hence lengthwise of the casing.

8. In a sampling thermometer adapted to be lowered by varying depths in a liquid, a tubular thermometer casing, a plug closing the lower end of the casing, a blade projecting axially from each of the casing ends, a pair of ears for each blade pivotally connected at their one ends to their respective blade for movement from a retracted to a spread position in which they form notches at the ends of the casing, the upper ears being apertured at their free ends for attachment thereto of a thermometer lowering and raising line adapted to be wound lengthwise of the casing through said notches, said ears having thickened hubs, and the edges of said hubs engaging against the ends of the casing when the ears are spread outwardly, thereby to limit the spreading movement of the ears.

9. In a sampling thermometer adapted to be lowered to varying depths in a liquid, a thermometer casing mounting a thermometer therein, the casing having an elongated window intermediate its ends through which the thermometer may be viewed, upper and lower pairs of ears pivotally connected to the ends of the casing for spreading and retracting movement about parallel axes which are disposed normal to the general plane of the window opening, the ears of the upper pair being apertured at their free ends for attachment thereto of a lowering and raising line, the ears of the pairs when spread apart providing notches at the ends of the casing through which the line may be wound lengthwise thereon and in covering relation to the window.

CLIFFORD G. HARRIS.

REFERENCES CITED

The following references are of record in the file of this patent:

UNITED STATES PATENTS

| Number | Name | Date |
|---|---|---|
| 1,876,592 | Beard | Sept. 13, 1932 |
| 1,947,592 | Haller | Feb. 20, 1934 |
| 2,184,472 | Sand | Dec. 26, 1939 |